United States Patent [19]
Neal et al.

[11] Patent Number: 6,164,711
[45] Date of Patent: Dec. 26, 2000

[54] GLOVE BOX DOOR WITH INTEGRAL LATCH MOUNT

[75] Inventors: Gary F. Neal, Bloomfield; Andrew D. Mawby, Detroit, both of Mich.

[73] Assignee: Noble Component Technologies, Inc., Detroit, Mich.

[21] Appl. No.: 09/313,509

[22] Filed: May 17, 1999

[51] Int. Cl.[7] ...................................................... B60R 7/06
[52] U.S. Cl. ......................... 296/37.12; 292/99; 292/123
[58] Field of Search ................................ 296/37.8, 37.12; 292/123, 118, 99, 223, 117, 97

[56] References Cited

U.S. PATENT DOCUMENTS

| | | | |
|---|---|---|---|
| 627,750 | 6/1899 | Happy | 292/99 |
| 2,117,339 | 5/1938 | Claud-Mantle | 292/123 |
| 2,332,628 | 10/1943 | French | 37/427 |
| 3,400,970 | 9/1968 | Daniluk | 296/35.3 |
| 5,803,516 | 9/1998 | Hempel | 292/336.3 |
| 5,890,755 | 4/1999 | Speelman et al. | 296/37.12 |

OTHER PUBLICATIONS

Photographs (2) of a glove box and latch assembly available in the art prior to May 17, 1998.

*Primary Examiner*—D. Glenn Dayoan
*Assistant Examiner*—Patricia Engle
*Attorney, Agent, or Firm*—Harness, Dickey & Pierce, P.L.C.

[57] ABSTRACT

A monolithic glove box door having a panel and a release assembly mount integral with the panel. The release assembly mount is adapted to couple a glove box latching mechanism to the panel for movement relative thereto as well as including an aperture adapted to receive a glove box handle for movement relative to the panel.

20 Claims, 5 Drawing Sheets

GLOVE BOX DOOR WITH INTEGRAL LATCH MOUNT

BACKGROUND OF THE INVENTION

1. Technical Field

The present invention relates to latch assemblies for automobile closures and, more particularly, to a glove box door and latch.

2. Discussion

Glove boxes for automobiles presently include a housing that is connectable to the console or instrument panel of the vehicle, a door panel connected to the housing for movement between an opened position and a closed position, and a latch assembly for releasably securing the closed door to the housing. The door panel and latch assemblies are separately manufactured and secured to one another in a separate assembly process.

Commonly available glove boxes include a handle operatively coupled to a latch mechanism to selectively move the latch mechanism between a locked and unlocked position. The latch mechanism in turn commonly includes a striker that is engageable with the housing in the locked position and an actuating member such as a rod that interconnects the striker to the handle. Assembly of the handle, latch mechanism, rod, and striker to the glove box door panel is commonly achieved through the use of fasteners. However, prior to fastening, each element must be precisely positioned relative to the door panel and housing.

Proper operation of the glove box will occur only if each of these separate components are precisely positioned and securely fastened to one another. Deviations in positioning cause numerous aesthetic concerns including undesirable gaps between the panel and housing and operational problems such as binding or excessive play between latched elements. Problems with the fit of glove box components most commonly manifest themselves in annoying rattles or squeaks. Moreover, fasteners common in the art generally develop additional play over time. This problem is especially apparent when threaded connectors engage plastic parts. Accordingly, the initial positioning and fastening of the glove box elements as well as the movement of elements over time has proven to be a difficult problem to address.

Notwithstanding these difficulties, those in the art continue to separately manufacture glove box doors, latch assemblies, and handle assemblies for various reasons. Glove box specifications include standards for inertia loading, intrusion pressures and forces, and airbag deployment forces. To satisfy these requirements, manufacturers select certain material for the glove box door, and different materials for the latch and handle assemblies to provide the necessary structural properties. Additionally, manufacturers generally focus on only one of the door, or latch and handle assemblies and have certain core competencies with regard to the structure and material that have traditionally been used to satisfy the standards for each component.

Accordingly, a perceived need has evolved in the glove box industry for the separate manufacture of the glove box door, latch, and handle assemblies in order to satisfy the structural requirements and capitalize upon the competencies of the manufacturers. Unfortunately, operational concerns of customers relating to ease of opening and closing of the glove box as well as noise abatement suffer as a result of the separate manufacture of these components.

SUMMARY OF THE INVENTION

In view of the above, it is an object of the invention to provide a glove box assembly that eliminates the difficulties and problems associated with the need to precisely position and secure the latch assembly to the door panel.

It is another object of the present invention to provide a monolithic glove box assembly that includes latching assembly mounting components integrally connected to and extending from the door panel.

It is a further object of the present invention to provide a glove box assembly having integral latch mounting components that are usable with sliding or rotating latches.

It is still another object of the present invention to provide a method for manufacturing a glove box having mounting components integral with the door panel.

Accordingly, the present invention is directed to a glove box having latch and handle mechanism mounting apparatuses integral with the door panel of the glove box. More particularly, the glove box door of the present invention includes a panel and a release assembly mount integral with the panel that is adapted to couple the latching mechanism to the panel for movement relative thereto. The release assembly mount also includes an aperture adapted to receive the handle for movement relative to the panel.

BRIEF DESCRIPTION OF THE DRAWINGS

Other objects and advantages of the invention will be become apparent to one skilled in the art upon reading the following specification and subjoined claims and upon reference to the drawings in which:

DETAILED DESCRIPTION OF THE PREFERRED EMBODIMENTS

Figure 1:
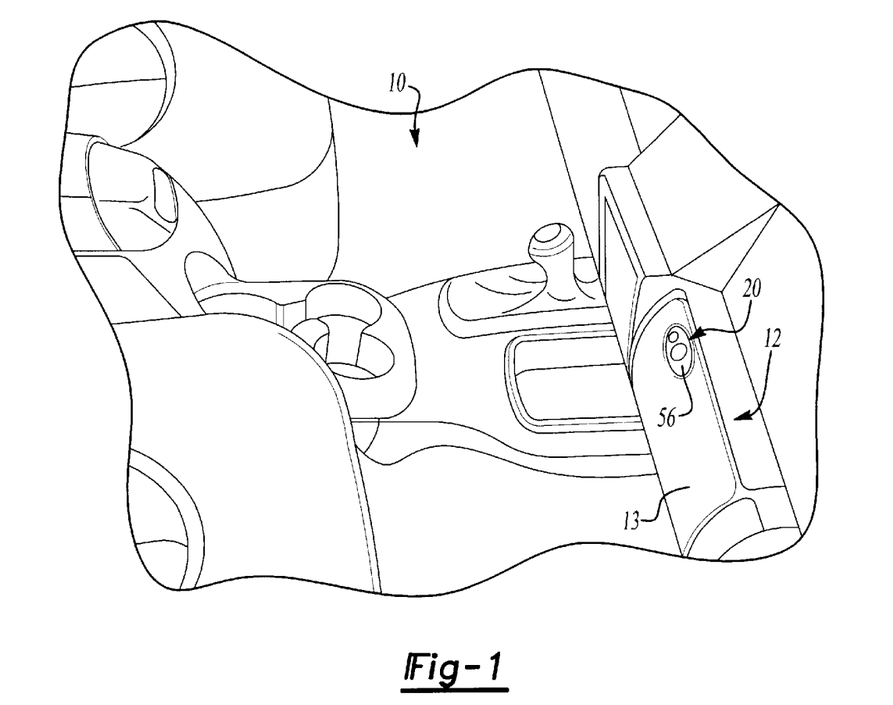
FIG. 1 is a partial perspective view of the interior compartment of an automobile having a glove box according to the present invention.

FIG. 1 illustrates an interior 10 of an automobile that includes a console 12 and a glove box assembly 13 having a housing (not shown) adapted to be fixed to the console in a manner known in the art. Glove box assembly 13 also includes a glove box door 14 and a release mechanism 16 (FIG. 3) coupled to the door as hereinafter described. Release mechanism 16 includes a latching mechanism 18 operably connected with a handle mechanism 20 whereby movement of the handle mechanism 20 between a released and engaged position moves the latching mechanism between its latched and unlatched positions. Those skilled in the art will appreciate that when the latching mechanism is in its latched position the latching mechanism engages a striker 22 (FIG. 3) that is fixed to the console thereby securing the glove box door in its closed position. Latching mechanism 18 is placed into its unlatched position by movement of handle mechanism 20 to its released position whereupon the glove box door 14 is pivotable between its opened and closed positions relative to the console.

Figure 2:
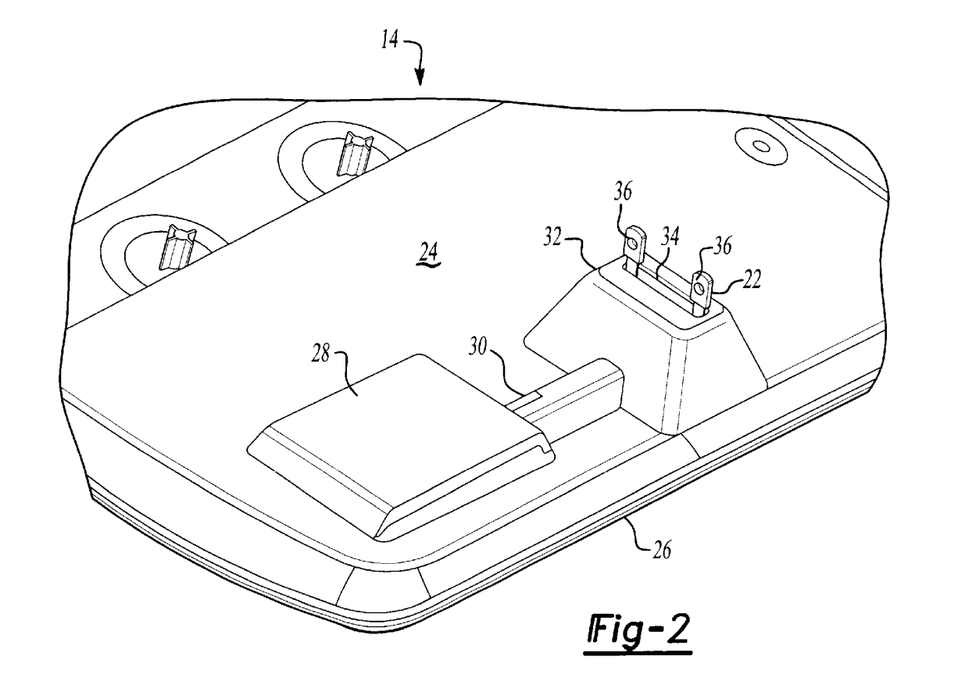
FIG. 2 is a partial perspective view of the inner side of the glove box door illustrated in FIG. 1.

As illustrated in FIG. 2, glove box door 14 generally includes an inner cover panel 24 and an outer structural panel 26. Inner cover panel 24 includes a handle recess 28, connecting rod recess 30, and latch mount recess 32. Latch mount recess 32 includes a slot 34 to accommodate striker 22 when the door is moved to its closed position as described above. Those skilled in the art will appreciate that apertures 36 on the terminal ends of striker 22 are fixed to the console or instrument panel so that the striker 22 moves in and out of slot 34 when the glove box door 14 is pivoted relative to the console.

Figure 5:
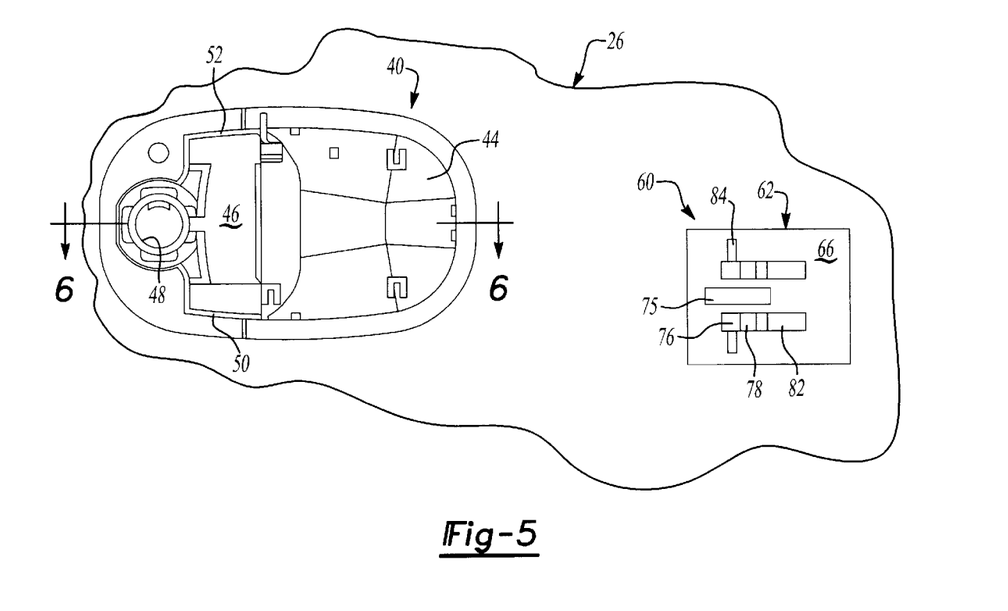
FIG. 5 is a top plan view similar to that shown in FIG. 4 with the handle, connecting rod, and latching mechanism removed for clarity.
Figure 6:
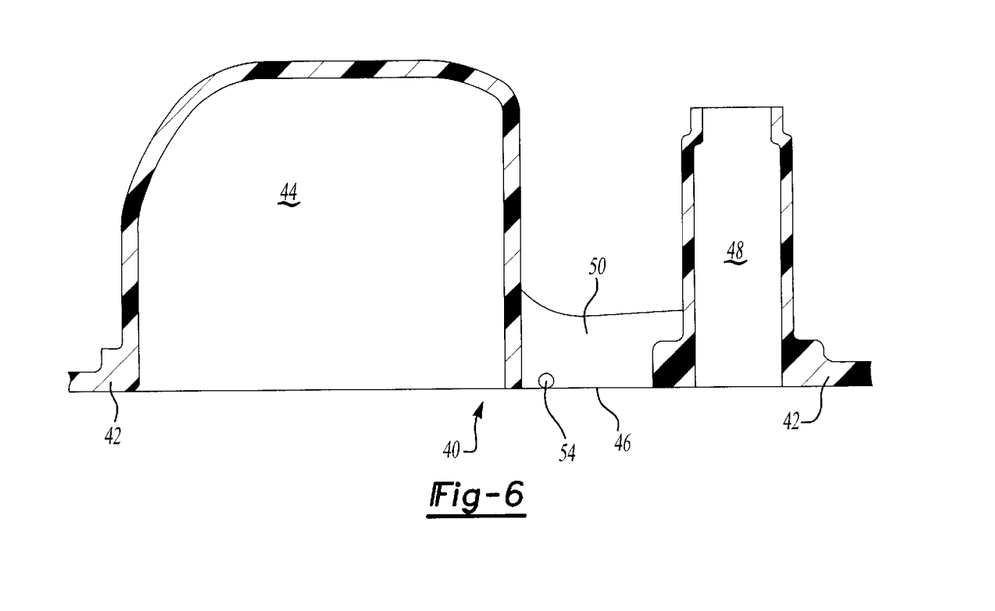
FIG. 6 is a sectional view taken along the line 6—6 shown in FIG. 5.

As generally discussed above, the present invention is directed to a monolithic glove box panel having integral latch and handle mounting structures. More particularly, as shown in FIG. 5 and 6, outer structural panel 26 includes a handle mount 40 and a latch mount 60 each integrally connected to and extending from a panel member 42. The monolithic construction of the handle and latch mounts relative to the panel member 42 create an outer structural panel 26 that is manufacturable through a single injection molding step that precisely and repeatably positions the handle and latch mounts on panel 42.

Figure 3:
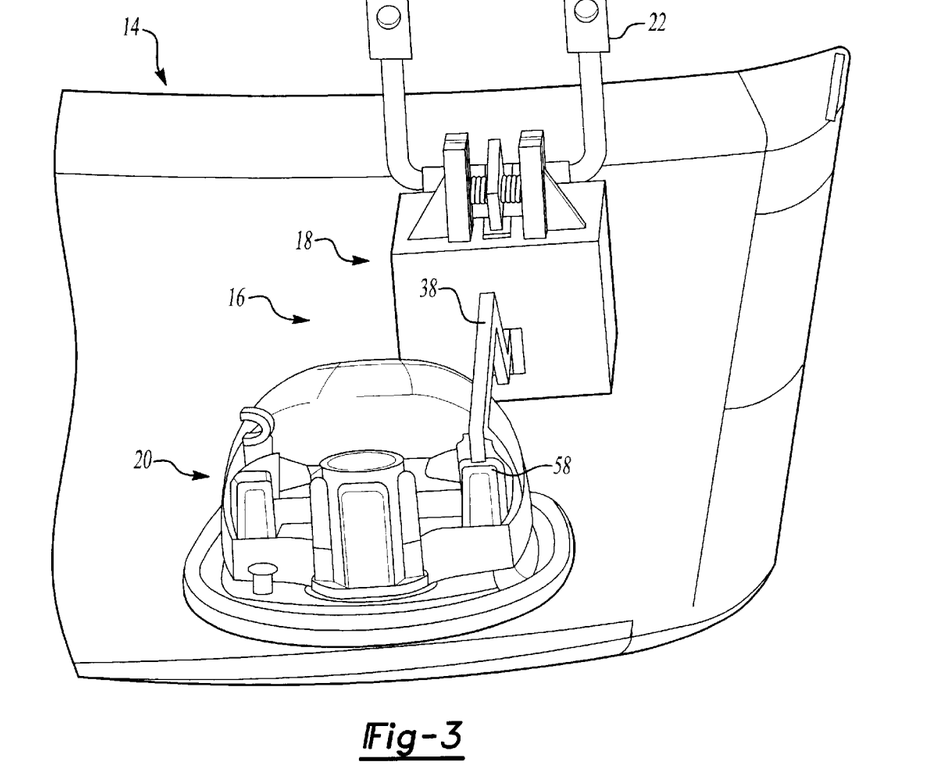
FIG. 3 is a side perspective view of the glove box door with its inner panel removed.
Figure 4:
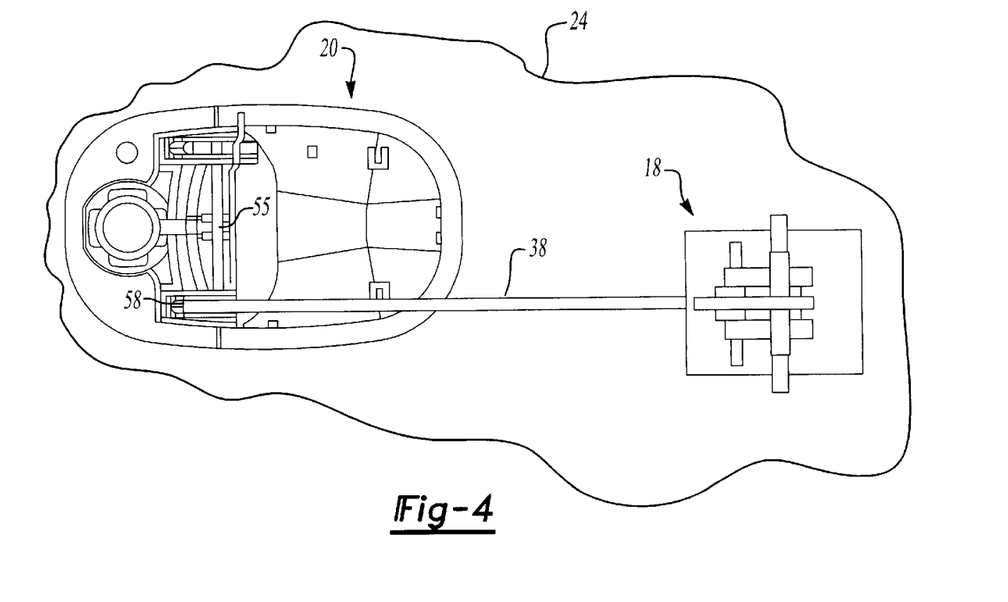
FIG. 4 is a top plan view of the handle and latch mechanisms illustrated in FIG. 3.
Figures 9, 10:
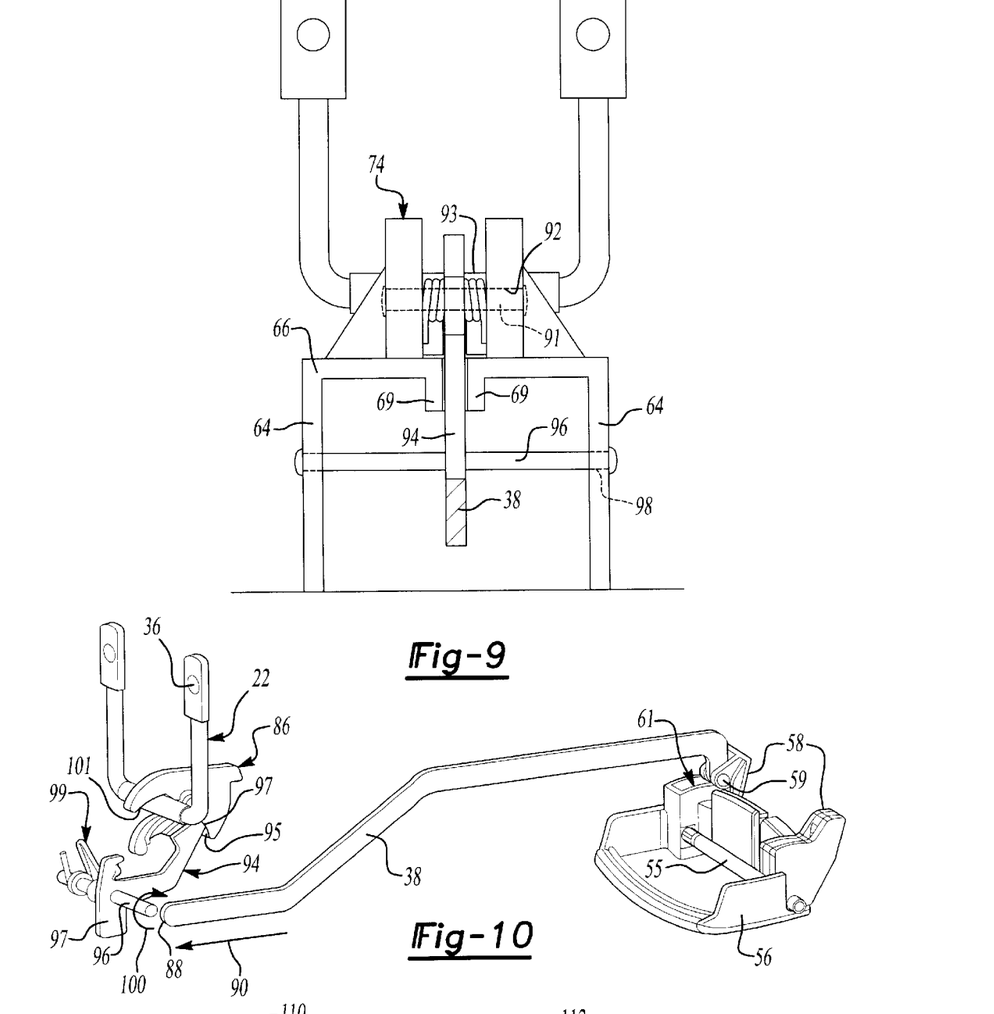
FIG. 9 is a side plan view of the latching mechanism and latch mount shown in FIG. 4.
FIG. 10 is a perspective view of the latching and handle mechanism.

Handle mount 40 includes a handle pocket 44, a passage 46, and a lock cylinder bore 48. Handle pocket 44 includes side walls 50 and 52 bounding passage 46 and each including an aperture 54 accommodating a pivot pin 55 (FIG. 4) for pivotably connecting a handle flap 56 (FIG. 1) to the handle pocket 44. The handle flap further includes connecting rod mounting posts 58 (FIGS. 3 and 4) that are connectable to a connecting rod 38 as shown in FIGS. 3 and 4 such as through the use of a pin 59 (FIG. 10). It should be appreciated that in certain applications the loading requirements or other design criteria for the glove box may necessitate modifications to the illustrated design. Numerous alternative connections may be used by those skilled in the art to accommodate these criteria. For example, the connecting rod may be coupled to the handle flap simply by disposing the rod directly within the cavity 61 formed by post 58.

Figure 7:
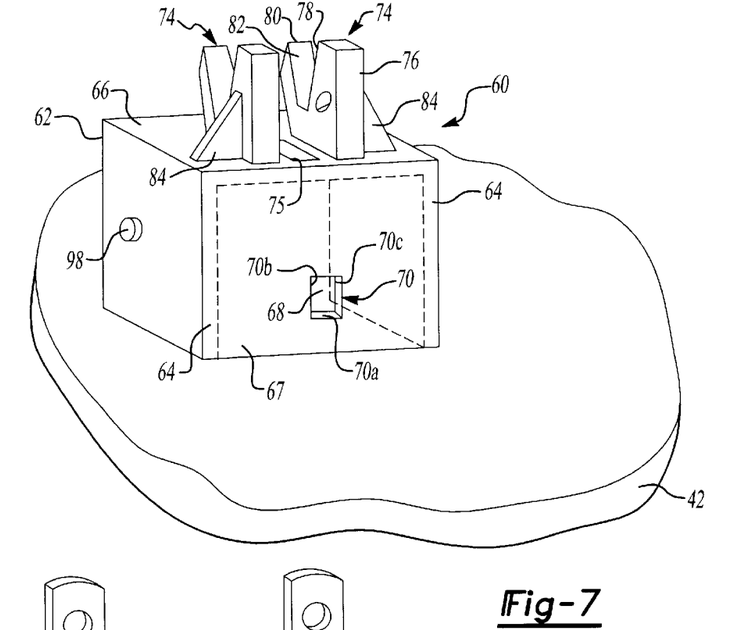
FIG. 7 is a side perspective view of the latch mount illustrated in FIG. 5.

In a fashion similar to the handle mount 40, latch mount 60 is also integrally connected to and extending from panel 42 of the outer structural panel 26. The preferred embodiment of latch mount 60 is illustrated in FIGS. 5 and 7 to include a monolithic mounting stand 62 extending from outer panel member 42. Stand 62 includes a top 66, a pair of upstanding side walls 64 integral with top 66, and a front wall 67 integral with side walls 64 and top 66. Side walls 64, top 66, and front wall 67 cooperate to define a cavity 68. A connecting rod aperture 70 is formed in front wall 67 and communicates with cavity 68 to accommodate the connecting rod as hereinafter described.

Figure 8:
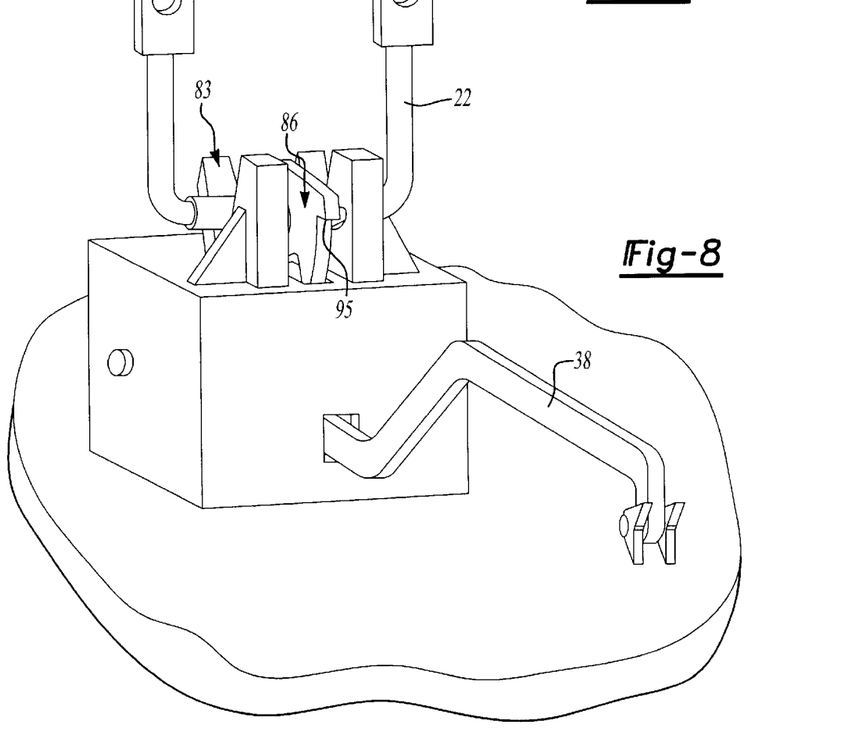
FIG. 8 is a side perspective view of the latch mount shown in FIG. 7 with the rotary latch, striker, and connecting rod coupled thereto.

Latch mount 60 further includes a pair of opposed locking hubs 74 and a cavity 75 in top 66 between hubs 74 to receive a rotary latch for connection to a pawl as hereinafter described. Hubs 74 each include a front member 76 defining a rearward sloping face 78 and a rear member 80 defining a forward sloping face 82. The forward and rearward sloping faces 82 and 78 of each locking hub 74 define a striker recess 83 that accommodates the striker as shown in FIG. 8. Front and rear members 76 and 80 each integrally extend from top 66 while a pair of integral support flanges 84 provide additional structural support for the locking hubs 74.

Forming the handle mount 40 and latch mount 60 integral with the outer panel member 42 of the glove box during the molding of the outer structural panel 26 consistently and precisely locates the handle mount 40 as well as the handle pocket 44, passage 46, and lock cylinder 48 relative to the periphery of the panel 42. Moreover, the monolithic nature of the outer structural panel 26 eliminates the need for fasteners to connect separately formed handle and latch mounts as is commonly done in the art. The elimination of fasteners not only eliminates a potential source of variance in the finished product but also eliminates problems associated with loosening of the fasteners over time such as is particularly prevalent when using threaded fasteners in a threaded bore formed of plastic.

The above discussed advantages of the monolithic construction of outer structural panel 26 are enhanced by the direct connection of the latching mechanism and handle mechanism to the latch and handle mounts 60 and 40, respectively. While the connection of a handle 56 to the handle mount 40 through pivot pin 55 is discussed above, the following description of the connection of a rotary latch 86 to latch mount 60 is provided for exemplary purposes. More particularly, a rotary catch 86 is connectable to latch mount 60 via a pivot pin 91 disposed in passages 92 formed in hubs 74 (FIGS. 8 and 9). A spring 93 is disposed about pivot pin 91 and engages rotary catch 86 and locking hubs 74 to urge rotary catch 86 into its unlatched position. A pawl 94 is pivotably coupled to latch mount 60 such as by disposing a pivot pin 96 within apertures 98 formed in side walls 64. Rotary catch 86 includes a stop 95 (FIG. 10) that is engageable with a blocking face 97 of pawl 94 to operatively connect connecting rod 38 to rotary catch 86. A spring 99 urges pawl 94 to rotate in a clockwise direction opposite arrow 100 and into its engaged position wherein blocking face 97 engages stop 95 of rotary catch 86.

Rotary catch 86 further includes a striker engagement slot 101 that faces rearward toward rear member 80 of locking hubs 74 when the rotary catch is in its latched position illustrated in FIGS. 8–10. Those skilled in the art will further appreciate that the rotary catch is pivotable under the biasing force of spring 93 about pin 91 from the illustrated latched position to an unlatched position where the striker engagement slot 101 generally faces upward in the direction of striker apertures 36 (FIG. 10) to allow disengagement of striker 22 from rotary catch 86.

In operation, a first end 88 of connecting rod 38 is disposed for sliding movement within rod aperture 70 (FIG. 7) such that connecting rod 38 rests on a lower surface 70a of rod aperture 70 and is laterally restrained by side surfaces 70b and 70c thereof. Movement of the handle mechanism 20 to its released position slides the first end 88 of connecting rod 38 in the direction indicated by arrow 90 whereupon first end 88 engages pawl 94 on a tail 97 thereof to pivot pawl 94 about pin 96 in a counterclockwise direction indicated by arrow 100 and into its disengaged position. With pawl 94 out of engagement with stop 95, rotary catch 86 moves into its unlatched position under the biasing of spring 93 thereby releasing striker 22 and allowing the door 14 to be pivoted relative to the console 12. When the door 14 is pivoted into its closed position, the striker is disposed within engagement slot 101 and pivots the rotary catch 86 in a clockwise direction until stop 95 passes the blocking face 97 of pawl 94 thereby allowing the pawl to pivot clockwise opposite arrow 100 and into the fully latched position.

Pawl 94 is configured and coupled to stand 62 such that pawl 94 passes through and is movable within cavity 75 formed in top 66 of stand 62. Additionally, as best illustrated in FIG. 9, stand 62 includes guide tabs 69 integral with an extending downwardly from top 66 for limiting lateral movement of the pawl 94 during operation. It should be appreciated that guide tabs 69 may extend above top 66 and adjacent hubs 74 to further restrain pawl 94 and rotary catch 86 from moving laterally.

A glove box having a one-piece door with an outer structural panel with an integrally extending handle mount 40 and latch mount 60 has been described with reference to FIGS. 1–10. Those skilled in the art will appreciate from the above description that the monolithic construction of the handle and latch mounts eliminate difficulties associated with prior art devices including the need to precisely position and secure separately manufactured latch and handle assemblies to the door panel. Moreover, contrary to the perceived need to separately manufacture completed latch and handle assemblies, the integrated latch and handle mounts provide better fit, more precise opening and closing operation, and better noise abatement than the prior art.

Figure 11:
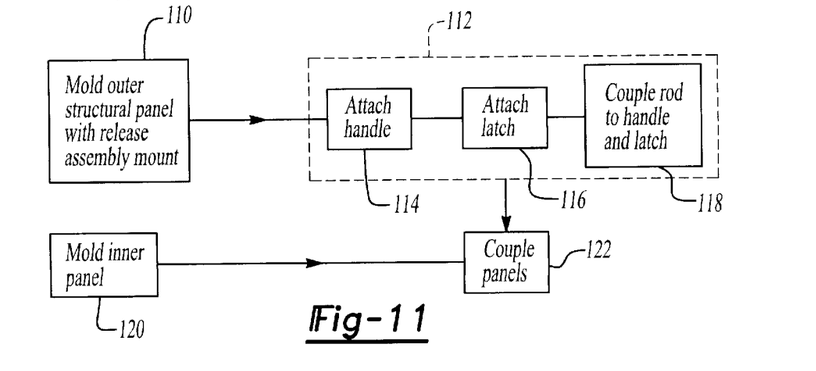
FIG. 11 is a schematic illustration of a method for manufacturing the glove box assembly illustrated in FIG. 2.

A method for manufacturing a monolithic glove box panel having an integral handle and/or latch mount will now be described with reference to FIG. 11. The method relates primarily to an injection molding process wherein the handle and latch mount assemblies are formed of the same material, in the same manufacturing step, and continuous with the glove box panel. However, those skilled in the art will appreciate that manufacturing processes other than injection molding may be used to manufacture the monolithic glove box panel described herein.

In the preferred embodiment, the inner and outer glove box panels 24 and 26, are each injection molded using a plastic, preferably a polycarbonate plastic commonly referred to as PC+ABS. More particularly, as shown in FIG. 11, the method of manufacturing the monolithic glove box includes the step 110 of injection molding the Class A outer structural panel 26 as a monolithic panel having integral handle and latch mount assemblies as described above.

After molding of the outer structural panel 26, the release mechanism 16 is coupled to the structural panel in step 112. In the rotary release mechanism illustrated in FIGS. 1–10, the handle 56 is pivotably coupled to the handle mount 40 via pivot pin 55 in step 114. Release mechanism attaching step 112 further includes the step 116 of attaching the rotary latch to the latch mount and the step 118 of operatively connecting the handle to the latch by coupling the connecting rod 38 to the handle and placing the rod in proximity to the latch pawl. At this point, the outer structural panel of the glove box assembly is completed with the release assembly operatively connected to the integral latch and handle mounts on the panel.

In step 120, the inner panel is molded of a plastic material similar to that used to form the outer structural panel and to include recesses 28, 30 and 32 shown in FIG. 2. In step 122 the outer and inner panels are positioned relative to one another and coupled together in a manner known in the art. Preferably, the outer structural panel is nested in an ultrasonic welder, the inner panel is positioned relative to the outer panel and the two panels are coupled to one another through ultrasonic vibration welding.

From the above description, it will be appreciated that the operative components of the release assembly are coupled to the outer structural panel in a precise and repeatable manner as illustrated in step 112. This positioning and attachment is facilitated through the integral latch and handle mounts formed in the monolithic glove box panel through the injection molding schematically illustrated by step 110.

A specific embodiment of the one-piece glove box with integral handle and latch mounts has been described with some specificity for use with a rotary type latching mechanism and a remote handle. However, the benefits attendant to the monolithic glove box with integral latch and handle mounts described and claimed herein may be realized in other latch applications including center mounted latch applications wherein the handle is not remote from the latch as well as in plunger rather than rotary type latch assemblies. Moreover, the above described method for manufacturing the monolithic glove box may be used with a variety of latching and handle mechanisms.

Additionally, it should be appreciated that a configuration of the handle and latch mount assemblies may be varied to improve operational characteristics or manufacturing of the glove box assembly. For example, the structure or relative positions of the handle and latch mounts may be modified to facilitate die draft during injection molding. In the embodiment of the invention illustrated in FIGS. 1–10, the wall 67 of the mounting stand 62 is positioned on the side of the stand proximate to the handle mount 40 to facilitate die draft. Moreover, the wall thicknesses, heights, and other structural dimensions of the handle and latch mount assemblies vary depending upon the requirements of the customer and, more particularly, upon the thickness in flexibility of the glove box panels as well as the impact loadings to which the glove box is subjected during testing. It is contemplated that the loading performance of the handle and latch mounts illustrated and described herein may be improved by providing radiused corners such as at the latch housing/panel interface.

The foregoing discussion discloses and describes an exemplary embodiment of the glove box of the present invention as well as a method for manufacturing same. One skilled in the art will readily recognize from such discussion and from the accompanying drawings and claims that various changes, modifications and variations can be made therein without departing from the true spirit and fair scope of the invention as defined by the following claims.

What is claimed is:

1. A door for use in a glove box assembly that is connectable to the instrument panel of a vehicle and includes a latching mechanism and a handle mechanism, the handle mechanism being connectable to the latching mechanism to move the latching mechanism between a latched position wherein the latching mechanism is adapted to fix the door in a closed position relative to the housing and an unlatched position wherein the door is movable relative to the instrument panel, said door comprising:

a monolithic panel having a latch mount integral with a panel member, said latch mount adapted to movably couple the latching mechanism to the panel member, said latch mount including a mounting stand having a pair of upstanding side walls integral with said panel member, a top integral with said side walls and a catch mount integral with said top, said catch mount having a hub assembly with a mounting aperture adapted to receive a pin to couple the latching mechanism to said latch mount.

2. The door of claim 1 wherein said hub assembly includes a pair of opposed support hubs each having first and second columns, each of said first columns including a rearward face, each of said second columns including a forward face, said rearward faces of said pair of opposed support hubs opposing said forward faces thereof to define a striker recess therebetween.

3. The door of claim 2 wherein said mounting aperture extends through each of said first columns.

4. The door of claim 1 wherein said top is spaced from said panel member to define a first cavity between said top and said panel member.

5. The door of claim 4 wherein said mounting stand further includes a front wall integral with said side walls, said top, and said panel, said front wall having a passage communicating with said first cavity and adapted to receive a connecting rod for operably coupling the handle mechanism to the latching mechanism.

6. The door of claim 5 wherein said each of said side walls include a pivot pin aperture to pivotably couple a pawl to the stand, the pawl being adapted to operably interconnect the connecting rod to a rotary catch.

7. The door of claim 4 wherein said stand further includes a second cavity passing through said top and communicating with said first cavity.

8. The door of claim 7 wherein said latch mount further includes opposed guide tabs extending from said top adjacent said second cavity.

9. The door of claim 1 wherein said monolithic panel further includes a handle mount integral with said panel member.

10. The door of claim 9 wherein said integral handle mount defines a handle cavity adapted to receive a handle for movement therewithin and an aperture adapted to receive a pivot pin to couple a handle to said panel.

11. The door of claim 1 wherein said latch mount includes a mounting stand integral with said panel member, said mounting stand including a mounting surface spaced from said panel member, said latch mount further including a catch mount integral with said mounting surface.

12. A glove box connectable to an instrument panel of an automobile, the instrument panel having a striker, said glove box comprising:

a door adapted for pivotable connection to the instrument panel for movement between an opened position and a closed position, said door including a monolithic panel having a panel member, a latch mount, and a handle mount, said latch mount including a mounting stand having a mounting surface spaced from said panel member, a pair of upstanding side walls integral with the panel, a top integral with the side walls and spaced from said panel member to define said mounting surface, a first cavity between said top and said panel member and a catch mount integral with the top and having a hub with a mounting aperture formed in said hub;

a latching mechanism coupled to said latch mount for movement between a latched position wherein said latching mechanism is adapted to secure the door in a fixed position relative to the instrument panel and an unlatched position wherein the door is movable relative to the instrument panel; and a handle mechanism coupled to said handle mount for movement between a released position and an actuated position, said handle mechanism operatively connected to said latching mechanism to move said latching mechanism into said unlatched position when said handle mechanism is placed in said released position.

13. The glove box of claim 12 wherein the catch mount includes a pair of opposed support hubs each having first and second columns, each of said first columns including a rearward face, each of said second columns including a forward face, said rearward face of said pair of opposed support hubs opposing said forward faces thereof to define a striker recess therebetween.

14. The glove box of claim 12 wherein said latch mount further includes a front wall integral with said upstanding side walls and said top, said front wall having an opening and wherein said latching mechanism includes a connecting rod disposed in said opening and operatively connecting said catch to said handle mechanism.

15. The glove box of claim 14 wherein said latching mechanism further includes a pawl operatively coupling said connecting rod to said catch, said pawl having a mounting pin pivotably coupling said pawl to said upstanding side walls.

16. The glove box of claim 15 wherein said catch is pivotably coupled to said mounting aperture in said hub and wherein said mounting stand further includes a second cavity passing through said top and communicating with said first cavity, said pawl being operably coupled to said connecting rod in said first cavity and extending into said second cavity for operable coupling to said catch.

17. The glove box of claim 12 wherein said integral handle mount defines a handle cavity and wherein said handle mechanism includes a handle disposed in said handle cavity and a pivot pin pivotably connecting the handle to the handle mount.

18. An automobile comprising:

an automobile body having an instrument panel and a striker fixed to said instrument panel;

a glove box door pivotably connected to the instrument panel for movement between an opened position and a closed position, said glove box door including a monolithic door panel having a panel member, a latch mount and a handle mount, said latch mount including a mounting stand having a pair of upstanding side walls integral with said panel member, a top integral with said side walls and a catch mount integral with said top and having a hub assembly with a mounting aperture adapted to receive a pin to couple the latching mechanism to the latch mount;

a latch mechanism coupled to said latch mount for movement between a latched position wherein said latch secures the door in a fixed position relative to the instrument panel and an unlatched position wherein the door is movable relative to the instrument panel; and a handle mechanism coupled to the handle mount for movement between a released position and an actuated position, said handle mechanism operatively connected to said latching mechanism to move said latching mechanism into said unlatched position when said handle mechanism is placed in said released position.

19. A method for making a glove box door comprising the steps of:

forming a monolithic panel having a panel member, a latch mount including a pair of upstanding side walls integral with said panel member, a top integral with said side walls, and a catch mount integral with said top and having a hub with said aperture and a handle mount integral therewith;

connecting a latch mechanism to said latch mount, said latch mechanism coupled to said latch mount for movement between a latched position and an unlatched position; and connecting a handle mechanism to the handle mount for movement relative thereto between an engaged and released position, said handle mechanism in operative engagement with the latch to move said latch between said latched and unlatched positions.

20. The method of claim 19 wherein said latch mount includes an aperture, the latch mechanism includes a rotary catch with a pivot pin and the step of coupling the latch mechanism to the latch mount includes inserting the pivot pin through said aperture to couple the latch mechanism to the latch mount.

* * * * *